United States Patent [19]

Porchia

[11] 4,234,139
[45] Nov. 18, 1980

[54] DEVICE FOR THE DETECTION OF THE STATE OF ROTATION OF A SHAFT, IN PARTICULAR FOR TAPE DECKS

[75] Inventor: Eliseo Porchia, Rome, Italy

[73] Assignee: Autovox, Rome, Italy

[21] Appl. No.: 15,084

[22] Filed: Feb. 26, 1979

[30] Foreign Application Priority Data

Mar. 9, 1978 [IT] Italy .............................. 48256 A/78

[51] Int. Cl.³ ..................... G11B 15/32; G03B 1/02; H01G 5/00
[52] U.S. Cl. .................................. 242/191; 361/289; 361/292
[58] Field of Search ............... 242/191, 186; 361/298, 361/289, 292

[56] References Cited

U.S. PATENT DOCUMENTS

| | | | |
|---|---|---|---|
| 1,600,842 | 9/1926 | Philips | 361/289 |
| 2,257,830 | 10/1941 | Wolff et al. | 361/289 |
| 2,261,879 | 11/1941 | Higgins | 361/289 |
| 3,517,282 | 6/1970 | Miller | 361/292 |
| 3,668,672 | 6/1972 | Parnell | 361/298 |
| 3,729,728 | 4/1973 | Hardway, Jr. | 361/298 X |
| 3,729,991 | 5/1973 | Hardway, Jr. | 361/292 |
| 3,800,196 | 3/1974 | Zimmermann | 242/191 |

Primary Examiner—Stanley N. Gilreath
Attorney, Agent, or Firm—Phillip H. Melamed; James W. Gillman

[57] ABSTRACT

A rotatable capacitor of variable capacitance is utilized to produce modulation of a signal, and demodulation of the signal produces a signal usable for determining the state of rotation of a shaft used for rotating the capacitor.

13 Claims, 5 Drawing Figures

DEVICE FOR THE DETECTION OF THE STATE OF ROTATION OF A SHAFT, IN PARTICULAR FOR TAPE DECKS

BACKGROUND OF THE INVENTION

The present invention relates to a device for detecting the state of rotation of a shaft, in particular for cassette tape recorders.

In tape recorders, be they of the recording or the playback type, it is very necessary to detect the state of rotation of a shaft which is part of the entrainment (drive) mechanism of the tape, so as to signal the end of the tape due to its complete unwindment from the take-off reel, or the stopping of the tape due to blockage of the drive mechanism or due to jamming. The need for the detection is even greater in the field of the cassette-type tape recorders, in which the tape unwinds from a take-off reel and winds on a take-up reel, while being completely enclosed in a cassette and therefore almost hidden from the view of the operator.

Additionally, a similar need is also felt in other related fields, for example, in the field of motion-picture cameras and projectors, in which once again there are used films enclosed in cassettes or, in any case, there are utilized instruments in which the movement of the film is hidden from the direct view of the operator.

There are generally known devices for detecting the state of rotation of a shaft to signal the end or the stoppage of a tape. Said devices are based on the transformation of the rotational motion of the shaft into a series of electrical pulses, obtained by means of a rotating switch, which are then used for the activation of an automatic means for blocking the tape drive motor or for ejecting the cassette tape carrier. Said electrical pulses, in the form of pulse trains, are generally obtained from a collector or commutator connected to the shaft to be monitored and being in the form of a segment-type collector or commutator on which there are located one or more brushes. An example of a device of this type and its use is described in Italian Pat. No. 849,991, which corresponds to U.S. Pat. No. 3,732,477 by R. Cicatelli. The pulse trains may be produced by means of magnetic and photoelectric devices.

All these known devices, however, have certain disadvantages: the segment-type collectors are subject to a notable wear, while the magnetic and photoelectric devices are very bulky.

SUMMARY OF THE INVENTION

To eliminate the inconveniences of prior art devices, a device according to the present invention comprises a rotating capacitor of variable capacitance, formed by at least two stationary armatures disposed on a first fixed support, and by a movable armature disposed on a second support, the movable armature rotatably driven by the shaft which is being monitored, the movable armature effecting a capacitive coupling, variable with its angular position, between the stationary armatures. The second support generally consists of a hub-carrying disk of a tape reel.

The present device also comprises a generator of electric current of relatively high frequency, connected to one of the stationary armatures, and a detection circuit connected to another stationary armature and able to detect amplitude modulation of the current generated by the current generator, said modulation being caused by the rotation of the movable armature and having a modulation frequency relatively low, proportional to the frequency of rotation of the movable armature.

BRIEF DESCRIPTION OF THE DRAWINGS

A non-limiting example of realization of the device of the present invention will now be described with reference to the attached table of drawings, in which.

DESCRIPTION OF THE PREFERRED EMBODIMENT OF THE INVENTION

Figure 1:
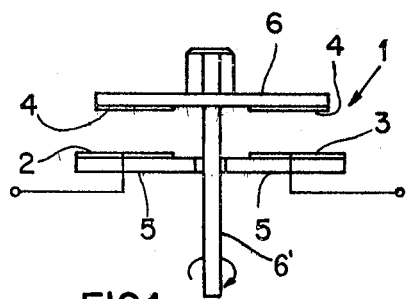
FIG. 1 is a sectional view of the rotating capacitor of the present device.
Figure 2:
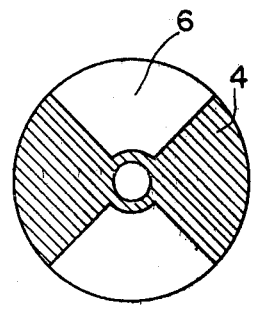
FIG. 2 is a plane bottom view of the movable armature of the capacitor of FIG. 1.
Figure 3:
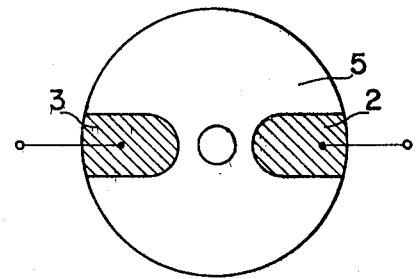
FIG. 3 is a plane top view of the stationary armatures of the capacitor of FIG. 1.

With reference to the drawings, and in particular to FIGS. 1, 2 and 3, the device of the invention comprises a rotating capacitor 1, consisting of two stationary armatures 2 and 3, and of a movable armature 4. The two stationary armatures 2, 3 are disposed on an insulating fixed support 5, while the movable armature 4 is disposed on a hub-carrying disk 6, which is to carry a tape reel and is rotatably moved together with the shaft 6 which one wishes to monitor.

Figure 4:
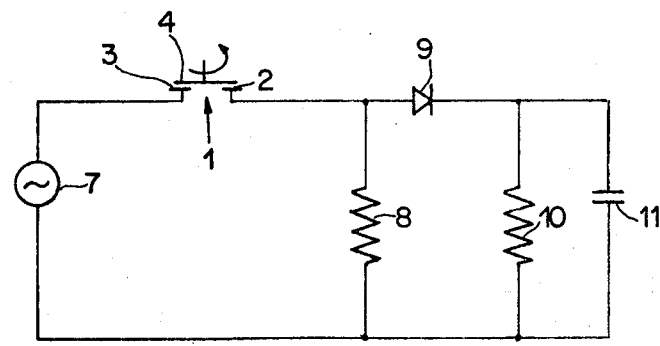
FIG. 4 is an electrical schematic diagram of a circuit of the device.

The movable armature 4 effects a capacitive coupling between the two stationary armatures 2, 3. The rotating capacitor 1 is inserted in an electric circuit comprising, as shown in FIG. 4, a generator 7 of electric current of relatively high frequency (in the order of 10 to 100 KHz) and a detection circuit.

The detection circuit comprises a resistor 8 disposed in parallel to a series connection formed by a diode 9 and by the parallel connection of a resistor 10 and of a condenser 11.

When the disk 6 rotates, the rotating capacitor 1 will assume different values of capacitance as a function of the angle of rotation because of the shape of the armatures 2, 3 and 4. In this manner, in correspondence to the maximum capacitive coupling, there will be obtained the maximum current circulating from the generator 7 to the detection circuit while, in correspondence to the minimum capacitive coupling, there will be obtained the minimum circulating current.

There is thus obtained a modulation of amplitude having a relatively low modulation frequency (in the order of 10 to 60 Hz), proportional to the frequency of rotation of the movable armature. The detection of said modulation furnishes the desired pulses, which are then utilized in a known manner (as per U.S. Pat. No. 3,732,477), for example, to cause the stoppage of the driving motor of the tape.

Figure 5:
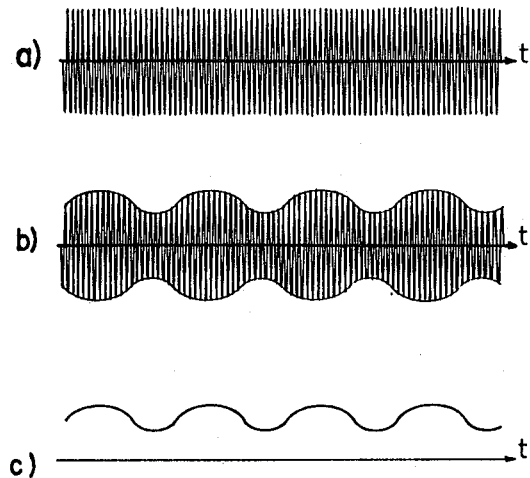
FIGS. 5($a$), ($b$), and ($c$) are graphs showing the waveforms at various points of the circuit of FIG. 4.

In FIG. 5 there are shown some waveforms of the circuit of FIG. 4.

In particular, FIG. 5$a$ shows the waveform of the signal at the stationary armature 3, FIG. 5$b$ shows the waveform of the signal at the stationary armature 2 after modulation caused by the rotating condenser 1, while FIG. 5$c$ shows the waveform of the detected and filtered signal available at the capacitor 11.

It is then noted that the resistor 8 serves to realize a closed path for the continuous current detected by the diode 9, the resistor 10 represents the load of the circuit, i.e., it simulates the input resistance of the subsequent circuit, while the capacitor 11 serves to ground the high frequency residues which are allowed to pass by the detector circuit.

There is also noted that the stationary armatures may be more than two, and may in addition have different shapes, in the same way that the movable armature can have different shapes as long as it is assured that the rotating capacitor 1 has a capacitance value variable as a function of the reciprocal angular position of rotation between the movable armature and the stationary armatures.

It is obvious that other numerous and different variations may be made by those skilled in the art to the aforementioned realization of the present invention, without departing from the spirit of the same and it is understood that all variations which fall within the scope of the following claims are part of the invention.

I claim:

1. A device for the detection of the state of rotation of a shaft, which device is characterized by the fact that it comprises:
   a driven shaft having a tape reel hub carrying disk thereon and rotatable therewith,
   a rotating capacitor of variable capacitance, formed by at least two coplanar stationary armatures disposed on a first fixed support, and by
   a movable armature disposed on a planar surface of said hub carrying disk and disposed parallel to the plane of said two stationary armatures, said movable armature facing said two stationary armatures,
   said movable armature movably driven by the shaft which is being monitored and varying the capacitive coupling between the stationary armatures and thereby creating a tape drive control signal.

2. A device according to claim 1 in which said movable armature is rotated by said shaft about an axis of rotation perpendicular to the planes of said stationary and movable armatures and causing variation of capacitive coupling between the stationary armatures.

3. A device according to claim 2, additionally comprising a generator of electric current of relatively high frequency, connected to one of the stationary armatures, and a detection circuit, connected to the other stationary armature and able to detect the amplitude modulation of the current generated by the current generator, said modulation being caused by the rotation of the movable armature by the shaft and having a relatively low modulation frequency, proportional to the frequency of rotation of the rotating armature, said detected amplitude modulation serving as a drive control signal for said driven shaft.

4. A device according to claim 3, in which the detection circuit comprises a first resistor connected in parallel to a series connection formed by a diode and by the parallel connection of a second resistor and of a capacitor.

5. A device according to claims 1, 2 or 3 wherein said movable armature comprises a planar butterfly pattern extending radially outwardly with a plurality of outwardly flaring electrically connected fan like projections projecting for a predetermined distance from the axis of rotation of the shaft.

6. A device according to claim 5 wherein said stationary armatures each comprise planar finger like projections extending inwardly toward the axis of rotation of the shaft and terminating within said predetermined distance from said axis of rotation.

7. A device according to claim 6 wherein the width dimension of the planar finger like projections comprising the stationary armatures is less than the outer circumferential dimension of the outwardly flaring fan like projections of the movable armature.

8. A device according to claims 1, 2 or 3 wherein said movable armature comprises a radial pattern with a plurality of radially outwardly extending electrically connected projections projecting for a predetermined distance from the axis of rotation of the shaft and wherein said stationary armatures each comprise planar finger like projections extending inwardly toward the axis of rotation of the driven shaft and terminating within said predetermined distance from said axis of rotation.

9. A tape player including a device for the detection of the state of rotation of a tape drive shaft, which device is characterized by the fact that it comprises:
   a driven shaft having a tape reel hub carrying disk thereon and rotatable therewith,
   a rotating capacitor of variable capacitance, formed by at least two coplanar stationary armatures disposed on a first fixed support, and by
   a movable armature disposed on a planar surface of said hub carrying disk and disposed parallel to the plane of said two stationary armatures, said movable armature facing said two stationary armatures,
   said movable armature rotatably driven by the shaft which is being monitored to vary capacitive coupling between the stationary armatures and thereby creating a tape drive control signal.

10. A device according to claim 9 wherein said movable armature comprises a planar butterfly pattern extending radially outwardly with a plurality of outwardly flaring electrically connected fan like projections projecting for a predetermined distance from the axis of rotation of the shaft.

11. A device according to claim 10 wherein said stationary armatures each comprise planar finger like projections extending inwardly toward the axis of rotation of the shaft and terminating within said predetermined distance from said axis of rotation.

12. A device according to claim 9 wherein said movable armature comprises a radial pattern with a plurality of radially outwardly extending electrically connected projections projecting for a predetermined distance from the axis of rotation of the shaft and wherein said stationary armatures each comprise planar finger like projections extending inwardly toward the axis of rotation of the driven shaft and terminating within said predetermined distance from said axis of rotation.

13. A device according to claim 9, additionally comprising a generator of electric current of relatively high frequency, connected to one of the stationary armatures, and a detection circuit, connected to the other stationary armature and able to detect the amplitude modulation of the current generated by the current generator, said modulation being caused by the rotation of the movable armature by the shaft and having a relatively low modulation frequency, proportional to the frequency of rotation of the rotating armature, said detected amplitude modulation serving as a drive control signal for said driven shaft.

* * * * *